(12) United States Patent
Tal

(10) Patent No.: US 10,612,962 B2
(45) Date of Patent: Apr. 7, 2020

(54) METHOD OF ESTIMATING MASS OF A SHIPPING CONTAINER AND ITS CONTENTS

(71) Applicant: LOGINNO LOGISTIC INNOVATION LTD, Shoham (IL)

(72) Inventor: Shachar Tal, Zichron Yaakov (IL)

(73) Assignee: Loginno Logistic Innovation Ltd., Shoham (IL)

( * ) Notice: Subject to any disclaimer, the term of this patent is extended or adjusted under 35 U.S.C. 154(b) by 100 days.

(21) Appl. No.: 15/871,995

(22) Filed: Jan. 16, 2018

(65) Prior Publication Data

US 2018/0202857 A1   Jul. 19, 2018

Related U.S. Application Data

(60) Provisional application No. 62/447,952, filed on Jan. 19, 2017.

(51) Int. Cl.
*G01G 19/08* (2006.01)
*G01G 19/52* (2006.01)
*G01G 9/00* (2006.01)

(52) U.S. Cl.
CPC ............... *G01G 19/08* (2013.01); *G01G 9/00* (2013.01); *G01G 19/52* (2013.01)

(58) Field of Classification Search
CPC .......... G01G 19/08; G01G 19/52; G01G 9/00
USPC ........................................................... 73/865
See application file for complete search history.

(56) References Cited

U.S. PATENT DOCUMENTS 6,157,894 A * 12/2000 Hess ...................... B64D 37/00
                                                        702/141
2017/0370765 A1* 12/2017 Meier .................. G01G 19/086
2018/0118294 A1*  5/2018 Anuth .................... B62H 5/003

* cited by examiner

*Primary Examiner* — Tarun Sinha
(74) *Attorney, Agent, or Firm* — Dr.Hanan Farber Patent Agent Ltd

(57) ABSTRACT

An apparatus and a method of estimating mass of a shipping container while being transported on a platform. At first, acceleration data of the shipping container is received or acceleration information is computed from at least one sensor operatively attached to the shipping container. Further, an acoustic signal associated with the shipping container is received. Furthermore, the acceleration data or the computed acceleration information is processed over a time interval when the acoustic signal becomes greater than a threshold, to estimate the mass of the shipping container from at least one of the acceleration data and the computed acceleration information.

13 Claims, 8 Drawing Sheets

METHOD OF ESTIMATING MASS OF A SHIPPING CONTAINER AND ITS CONTENTS

FIELD OF INVENTION

The present disclosure generally relates to measuring the gross mass of a shipping container and its contents during transport of the shipping container. More specifically, the present disclosure relates to an apparatus and method for measuring gross mass of a shipping container and its contents based on force and acoustic analysis.

BRIEF SUMMARY

Various systems and methods are disclosed herein for estimating mass of a shipping container while being transported on a platform. The apparatus comprises sensors coupled to the shipping container. The sensors include an accelerometer, a proximity sensor and an acoustic sensor. The accelerometer determines acceleration data of the shipping container or acceleration information of the shipping container. The acoustic sensor measures acoustic signal associated with the shipping container. The proximity sensor determines vibration distance using a proximity sensor, while the shipping container is on a platform with a known spring constant such as a truck, ocean vessel, trailer or train. Using the data received from the sensors, mass of the shipping container is estimated by processing the acceleration data or the computed acceleration information over a time interval, when the acoustic signal becomes greater than a threshold.

In another aspect, a non-transitory computer readable storage medium comprising program instructions which, when executed, are configured to perform a method estimating mass of a shipping container while being transported on a platform is disclosed.

BRIEF DESCRIPTION OF FIGURES

In the following drawings like reference numbers are used to refer to like elements. Although the following figures depict various examples of the invention, the invention is not limited to the examples depicted in the figures.

DETAILED DESCRIPTION

The following detailed description is intended to provide example implementations to one of ordinary skill in the art, and is not intended to limit the invention, as one of ordinary skill in the art will understand that variations can be substituted that are within the scope of the invention as described. Further, relational terms such as first and second, and the like, may be used to distinguish one entity from the other, without necessarily implying any actual relationship or order between such entities.

By way of introduction, the present disclosure relates to a method and an apparatus for estimating mass of a shipping container while the shipping container is moving on a platform such as on a truck. The apparatus includes sensors coupled to the shipping container. The sensors may include one or more of an accelerometer, a proximity sensor configured to measure distance to a point on the ground, a gyroscope configured to measure angular orientation of the shipping container and an acoustic sensor configured to sense sound. The accelerometer obtains acceleration information of the shipping container. The acoustic sensor obtains acoustic data associated with the shipping container. The proximity sensor or measures distance between the shipping container and the ground as a function of time. The data from the accelerometer, the proximity sensor and the acoustic sensor is fed to a processor.

Figure 1:
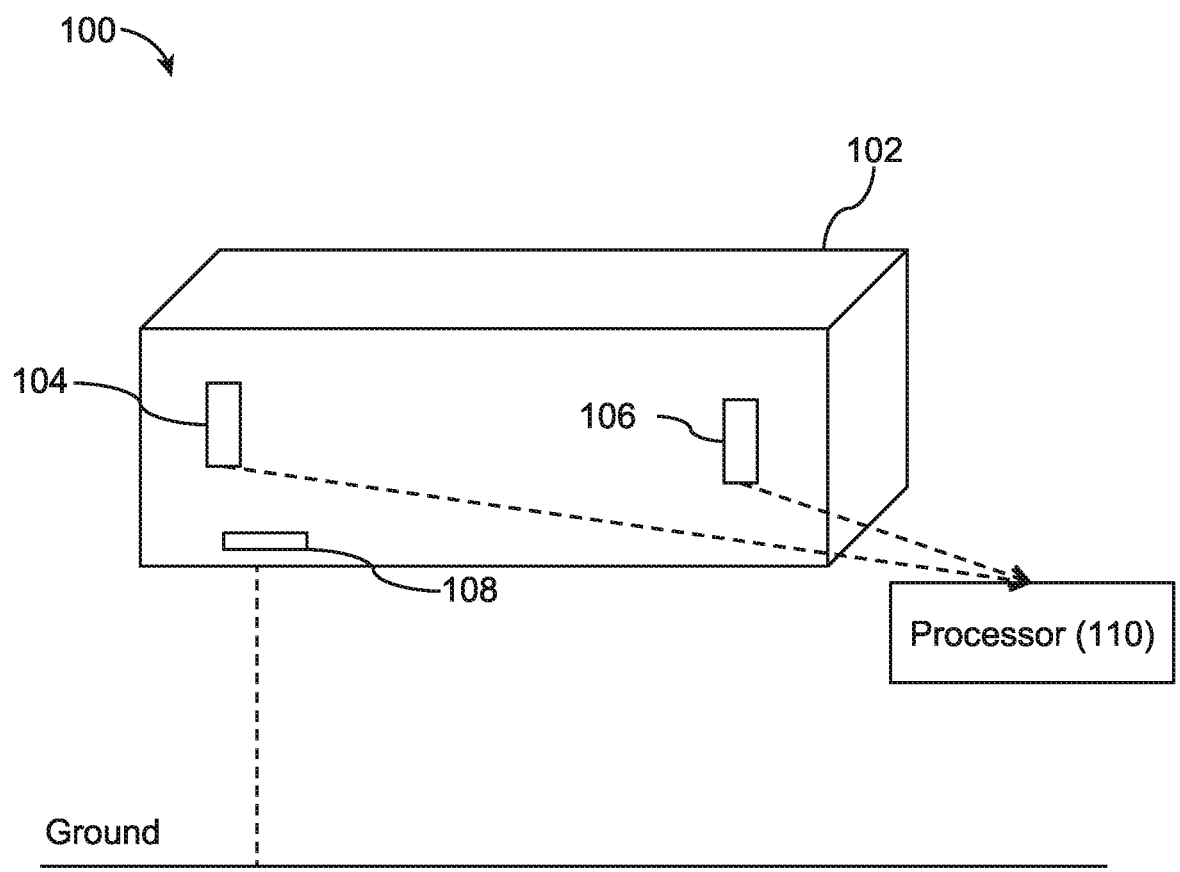
FIG. 1 illustrates an apparatus for estimating mass of a shipping container, in accordance with one embodiment of the present disclosure.

Based on data received from the sensors, the processor estimates the mass of the shipping container. Specifically, the processor estimates the mass using the distance measured and by applying windowing function to the acceleration data based on the acoustic data and extracts vibration frequency upon applying the windowing function. Reference is now made to the drawings. Referring to FIG. 1, an apparatus 100 for estimating mass of a shipping container 102 is illustrated, in accordance with various embodiments of the present disclosure. The shipping container 102 shown in FIG. 1 is a typical container, which is made in various shapes, sizes and specifications in order to best transport goods or items being shipped. The apparatus 100 may comprise a plurality of sensors such as an accelerometer 104, an acoustic sensor 106, a proximity sensor 108. Further, the apparatus 100 may comprise a processor 110 communicatively coupled to the accelerometer 104, the acoustic sensor 106, and the proximity sensor 108. Each of the sensors may be attached on one side or a corner of the shipping container 102 using mechanical fasteners or any other known attaching mechanisms.

Although the accelerometer 104, the acoustic sensor 106, the proximity sensor 108, and the processor 110 are shown as individual components that are coupled to the shipping container 102, it should be understood that the accelerometer 104, the acoustic sensor 106, the proximity sensor 108, and the processor 110 may be provided in a single device (not shown) for estimating mass of the shipping container 102, and such implementation is within the scope of the present disclosure.

In one exemplary implementation, the apparatus 100 may be provided on a vent cover installed on the shipping container 102 vent cover as disclosed in US patent publication U.S. Pat. No. 8,797,161 of the present applicant/assignee. U.S. Pat. No. 8,769,7161 describes a vent cover for installing on a shipping container. The vent cover includes a housing adapted for covering a vent hole of the shipping container. A direct current (DC) power source is encased or enclosed in the housing. The DC power source includes a battery. The vent cover may also include a circuit board attached to the DC power source. An antenna may be located on a surface of the housing and attached to the circuit board. The circuit board may include a satellite antenna interface for a satellite antenna and a global positioning system (GPS) module attached to the satellite antenna interface. The vent cover may include an environmental sensor for sensing a parameter of the shipping container. The environmental sensor may be adapted to protrude through a hole in a wall of the shipping container when the vent cover is mounted on the shipping container.

In one implementation, the accelerometer 104 may include a 3D accelerometer. The accelerometer 104 may be used to measure acceleration and/or vibration of the shipping container 102. The acoustic sensor 106 may include, but not limited to, a microphone or a geophone. The acoustic sensor 106 may be used to measure acoustic vibrations of the shipping container 102 and/or sound emanating from inside the shipping container. The proximity sensor 108 may measure distance between the shipping container 102 and the ground as a function of time. The processor 110 retrieves data from each of the accelerometer 104, the acoustic sensor 106, and the proximity sensor 108.

Figure 2A:
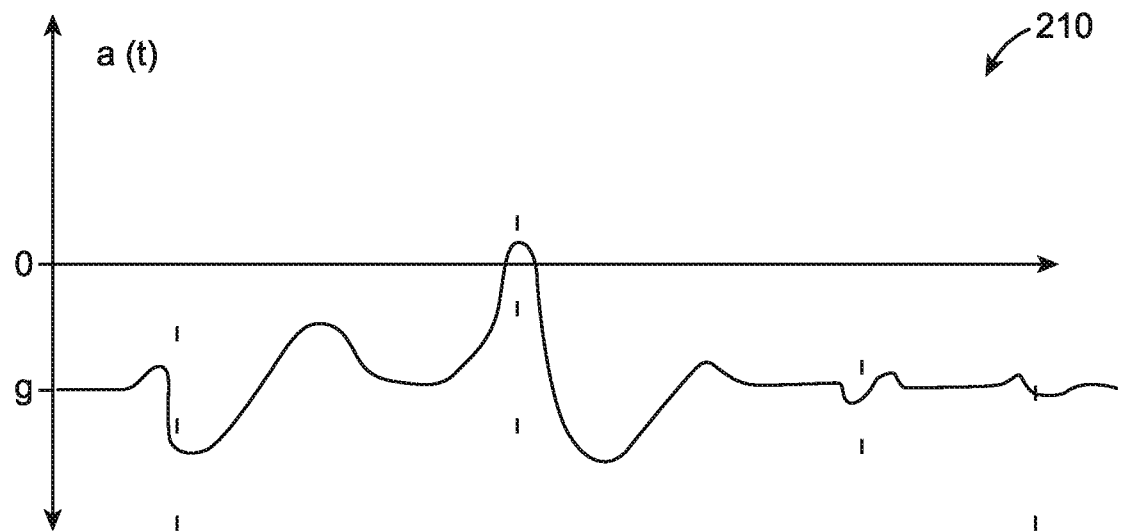
FIG. 2A illustrates processing of a signal associated with acceleration data is shown, in accordance with an embodiment of the present disclosure.
Figure 2B:
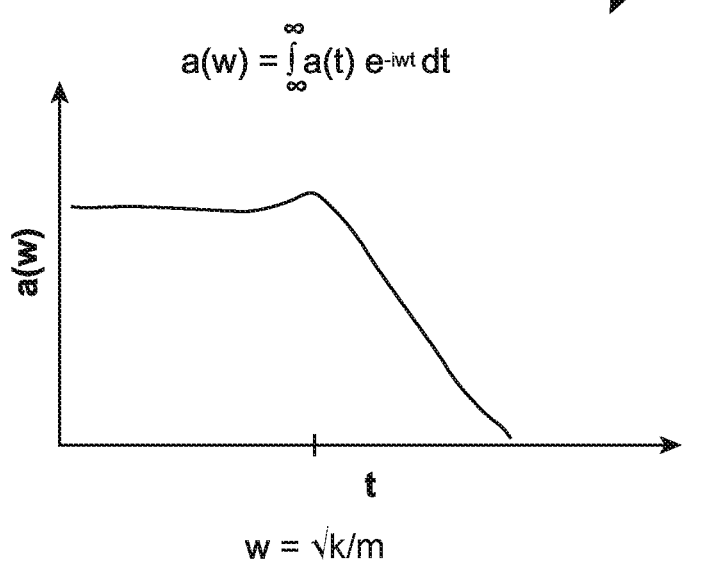
FIG. 2B illustrates applying Fourier transform (FT) on the signal, in accordance with one embodiment of the present disclosure.

Upon receiving acceleration data from the accelerometer 104, the processor 110 may process the acceleration data. A signal processed by the processor 110 is plotted in a graph 210 as shown in FIG. 2. Subsequently, the processor 110 may apply Fourier transform (FT) on the signal as shown in a graph 215, as shown in FIG. 3. After applying Fourier transform, the acceleration measurement is calculated using $$a(w) = \int_{\infty}^{\infty} a(t)e^{-iwt}dt$$

Similarly, the processor 110 may receive the acoustic data from the acoustic sensor 106. Specifically, the processor 110 may capture sound waves from the acoustic data. The processor 110 captures sound waves as containers resonate differently to sound waves depending upon on the shipping container being empty or quarter-full, half-full or full. From the acoustic data, the processor 110 may find peaks and may pick big events in the sound waves.

Further, the proximity sensor 108 may measure the distance between the shipping container 102 and the ground as a function of time. In other words, the proximity sensor 108 measures d(t), where d is the distance. It is to be understood that the distance between the shipping container 102 and the ground is equivalent to a spring that is supporting the shipping container 102. As known, when the spring is compressed, the distance between the shipping container 102 and the ground becomes small. On the other hand, when the spring is extended, the distance between the shipping container 102 and the ground becomes large.

Now, in order to estimate the mass of the shipping container 102, the acceleration data a(t) and/or distance d(t) may be used. Specifically, Hooke's differential equation may be used to estimate the mass of the shipping container 102. The Hooke's differential equation is presented below:

$$F=m*a(t)=-k*(d(t)+c)$$

Where c is the equilibrium spring length, which is calculated by averaging the distance, d over time.

In order to estimate the mass of the shipping container 102 for each instant of time, the following equation is used.

$$m(t) = \frac{-k \cdot d(t)}{a(t)}$$

Referring to FIG. 3A-FIG. 7, an example for estimating mass of a shipping container for each instant of time while the shipping container is being transported on a platform is explained. It should be understood that the following is an example illustrating one implementation of estimation of mass of the shipping container and the same should not be construed to limit the present disclosure.

Figure 3A:
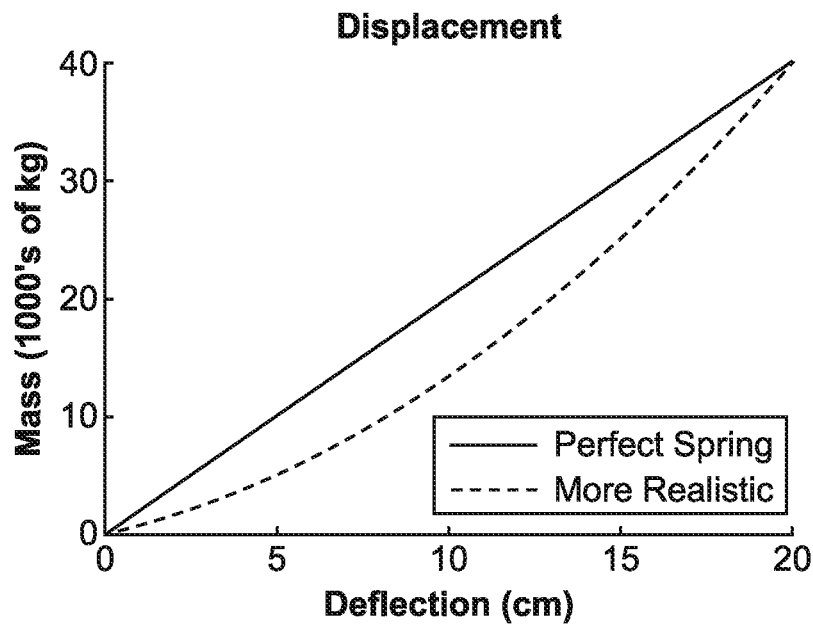
FIGS. 3A and 3B illustrates spring displacement and spring constant, in accordance with an example of the present disclosure.
Figure 3B:
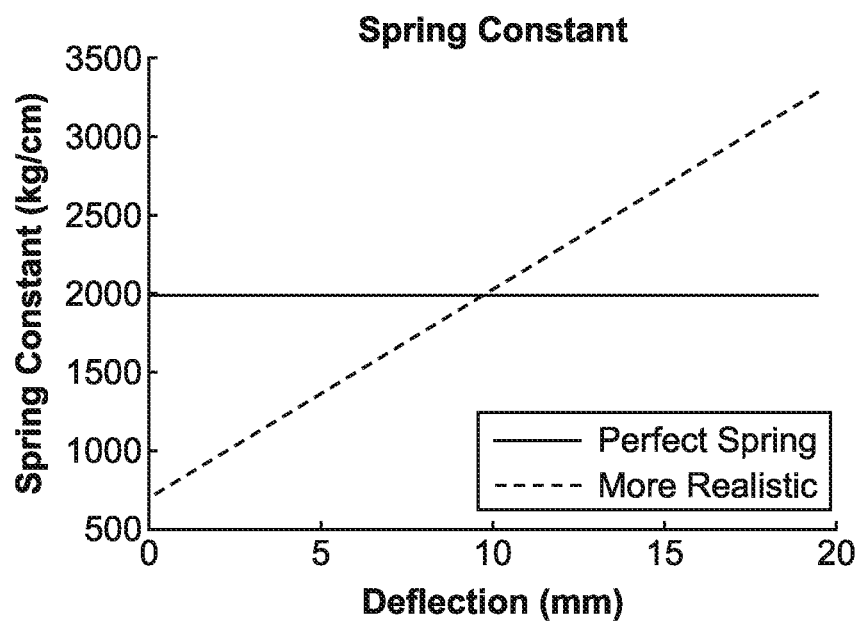

As presented above, springs e.g., leaf springs may be used to carry the shipping container. As known, the spring may have a linear displacement with force. Further, when the spring is suspended, the displacement is non-linear, as shown in FIG. 3A and spring constant will be as shown in FIG. 3B. If the force is more, then the displacement reduces. Further, it is known that the springs are stiffer for heavier loads. The spring displacement and spring constant may be calculated using a spring pack by taking a truck and adding weight to check how it expands or contracts.

Figure 4A:
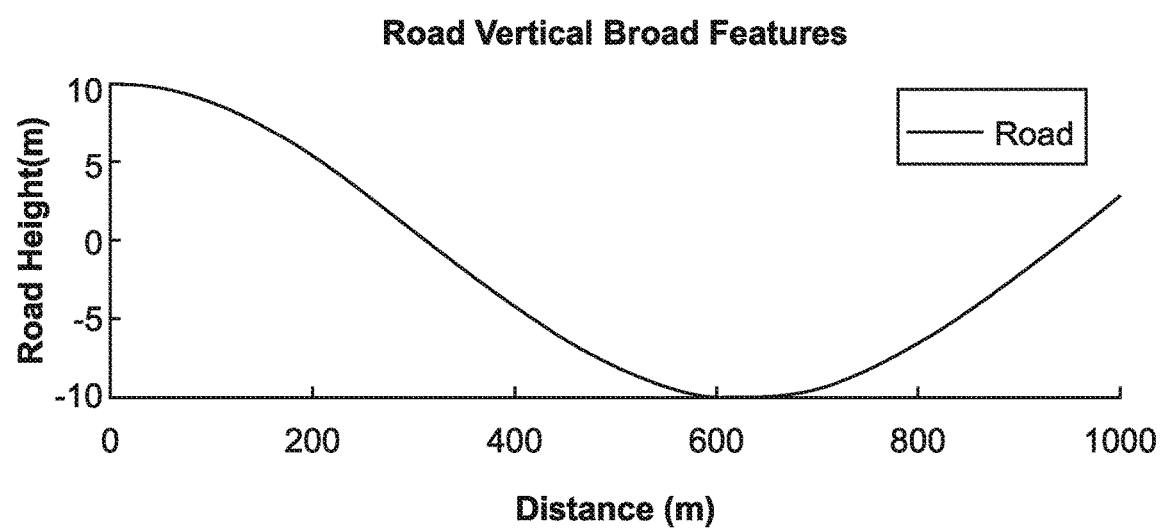
FIGS. 4A and 4B illustrate a road and bumps generated over a distance, in accordance with the example of the present disclosure.
Figure 4B:
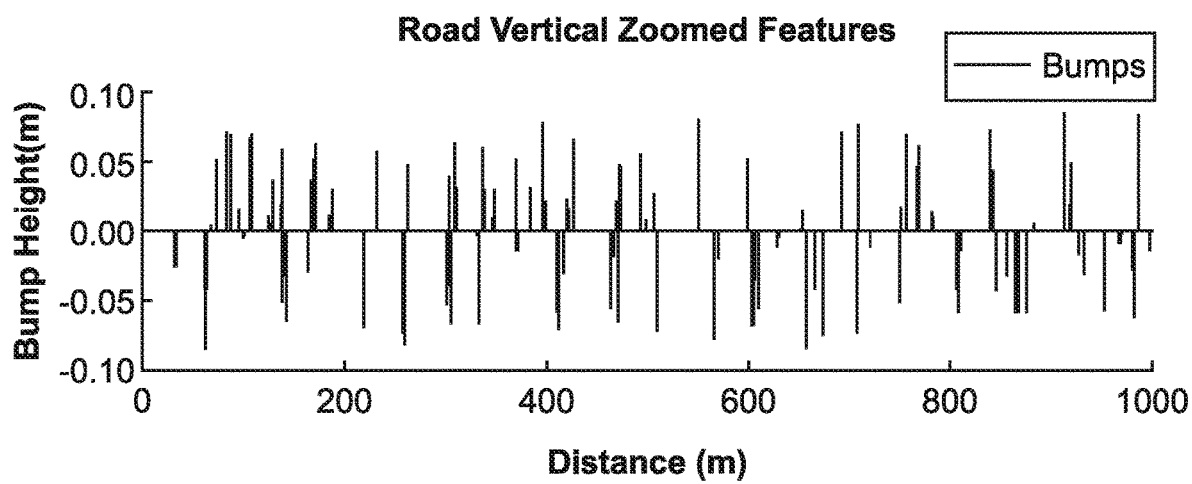

Further, ground bump data may be obtained. For the current example, the road of one kilometer is considered to have two hills and a valley, as shown in FIG. 4A. When the data is looked closely, we may find small bumps as shown in FIG. 4B. In order to obtain small bumps; a cosine function with a ten meter amplitude over the kilometer is considered. Further, random bumps of height or depth +10 centimeter and −10 centimeters are generated. As can be seen from FIG. 4B, the bumps e.g., a hundred may be generated over the kilometer depending on how old the road is and so on.

Further, response of the truck is captured. Specifically, truck response is calculated using:

$$F=ma=m(y''-x'')=kx+lx'-mg.$$

where, F is force,
m is mass of the truck
a is acceleration
x is the compression of the springs (positive indicates spring being compressed)
y is the height of the ground (positive is higher up).
x,y are functions of time, and primes denote time derivatives.
k the spring constant is actually a function of x as well.
l is a damping term.

It should be understood that 'l' is required, without which the truck may bounce repeatedly after a bump on road.

Figure 5A:
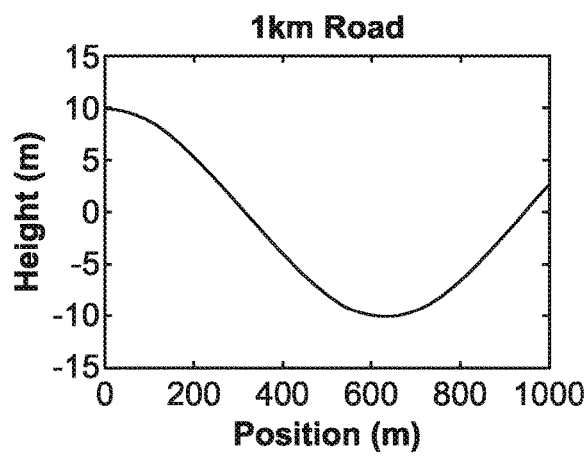
FIG. 5A-5D illustrate a graph plotted for road showing bumps, in accordance with the example of the present disclosure.
Figure 5B:
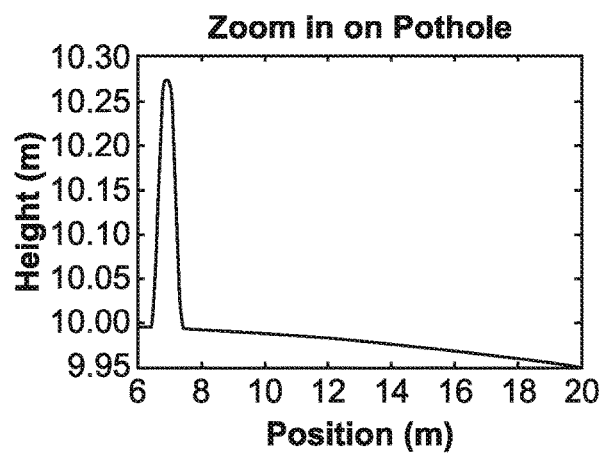
Figure 5C:
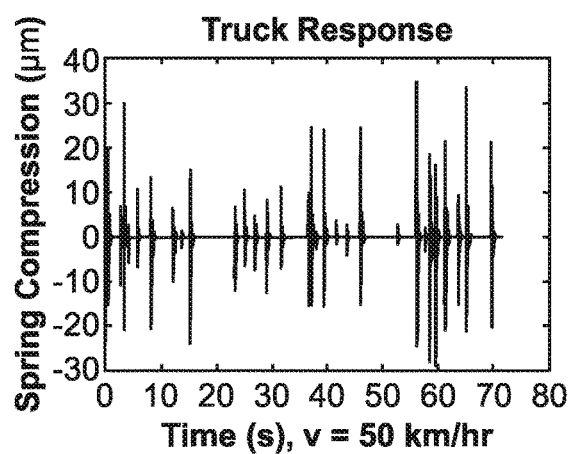
Figure 5D:
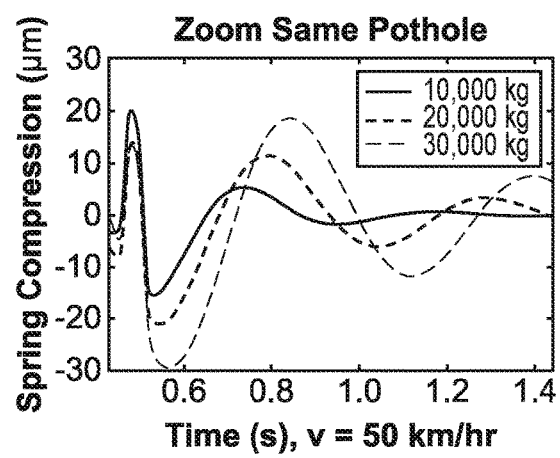

Using the above equation, motion of the truck is solved. Referring to FIG. 5A, a graph plotted for road is shown. Further, a zoom in on a pothole of the road is shown in FIG. 5B. Referring to FIGS. 5C and 5D, the response of the truck is shown. Specifically, FIG. 5D shows the response of the truck changing for different mass of the truck. As can be seen from FIGS. 5B and 5D, the vibrations, which are measured by the accelerometer, get larger with the mass and the frequency gets slower. In other words, the size of the vibrations is dependent on the size of the bumps, but not solely on the frequency, which results in finding of mass of the shipping container. As specified above, the accelerometer measures the vibrations of the shipping container i.e., effects of the bumps on a moving vehicle.

For the acoustic data, peaks are detected such as to focus on data only after a big bump where the frequency of vibration is clear. It is important to focus on data only after a big bump; this is because, the required data collection rate from the accelerometer has to be high during the vibrations, such that the peak detection drastically reduces the data that needs to be collected. For instance, the acoustic sensor is wired to an analog threshold circuit so that the processor 110 records the accelerometer data only after the big bumps. In other words, a threshold is selected for the acoustic signal. Whenever a loud noise is detected above the threshold indicating that the truck went over a big bump, then the acceleration data in a defined time interval e.g., one second is saved and the acceleration data is used for subsequent processing.

Figure 6A:
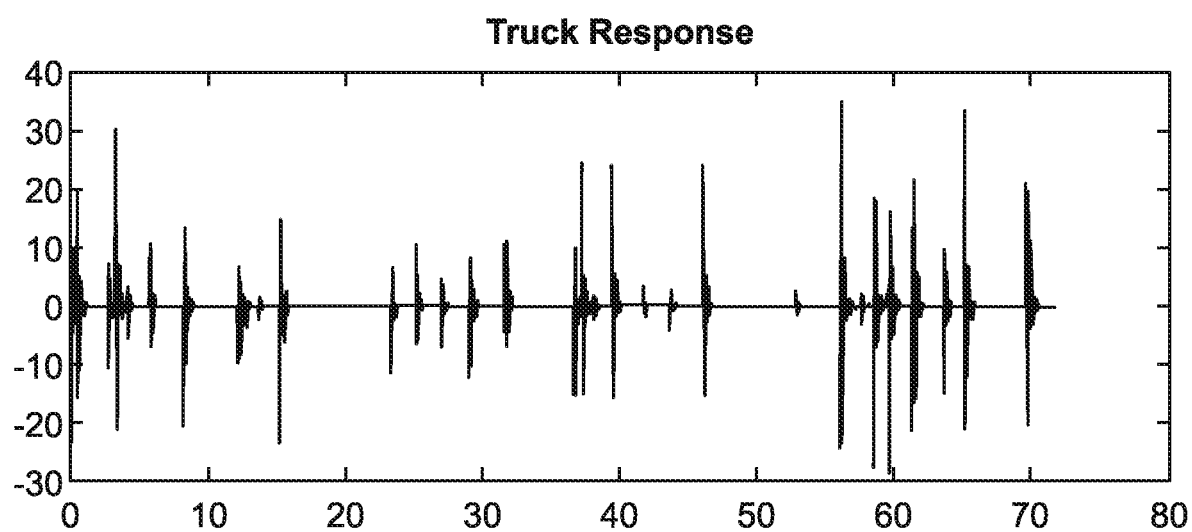
FIG. 6A-6B illustrate a response of the truck, in accordance with the example of the present disclosure.
Figure 6B:
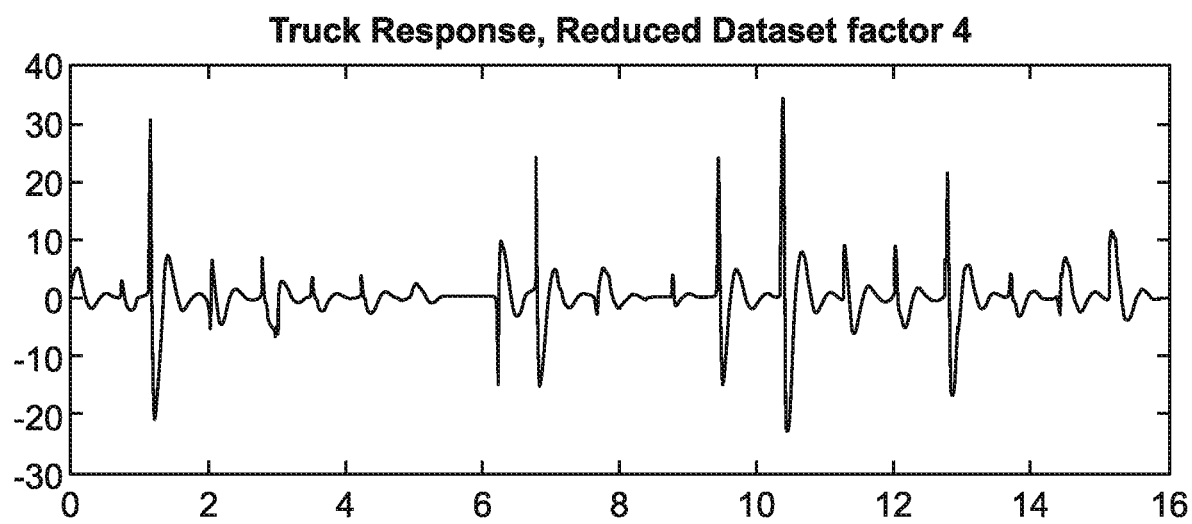

Referring to FIG. 6A, response of the truck upon adding an analog or digital circuit that only records the accelerometer data for one second after a bump is shown. Referring to FIG. 6B, the response of the truck after reducing the dataset by a factor of four, i.e., windowing data is shown.

Figure 7:
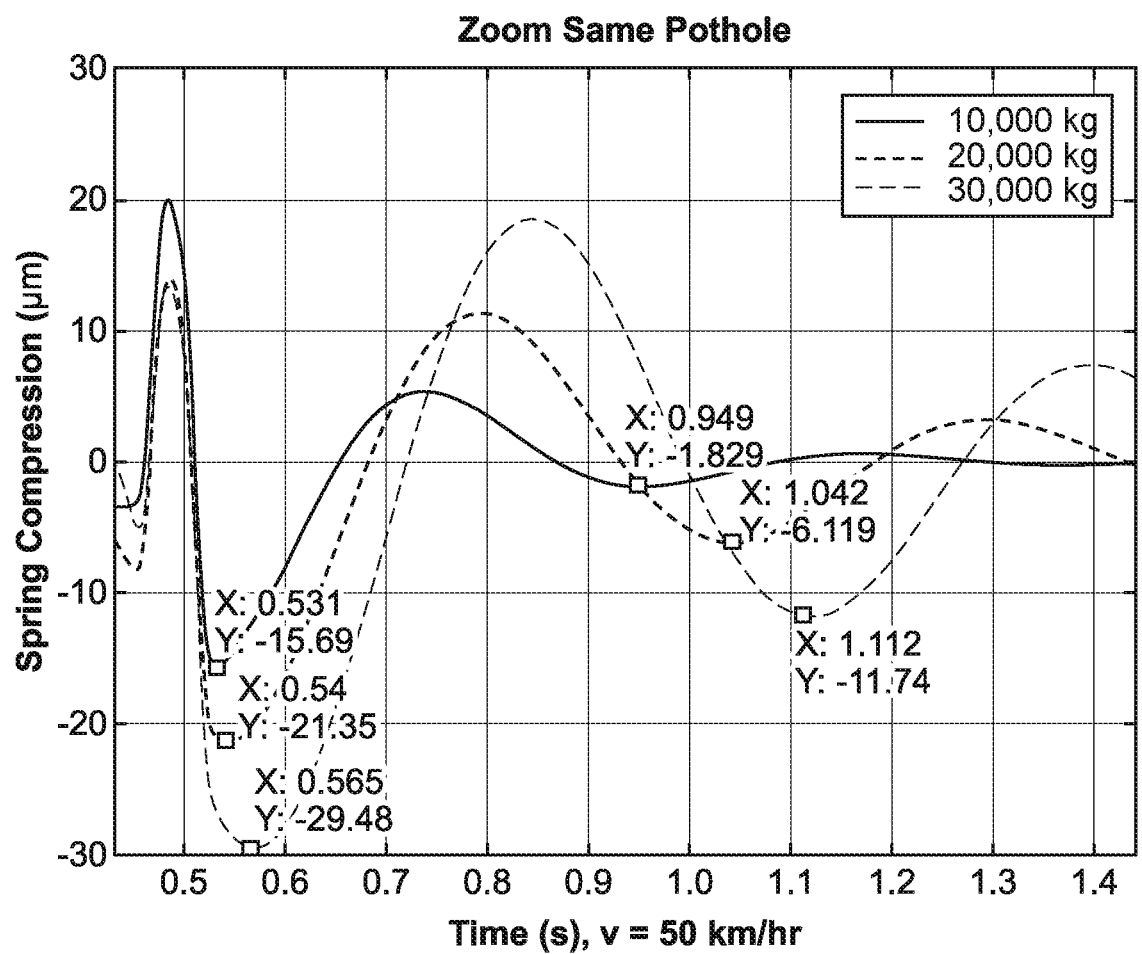
FIG. 7 illustrates a graph showing peaks and measuring average space between the peaks, in accordance with the example of the present disclosure.

Subsequently, the acceleration data saved is processed to measure the resonant frequency in the acoustic signal after the bumps. In order to measure the resonant frequency after bumps, all the peaks in the acceleration data are found and then average space between them is measured. For example, Fourier transform is performed on the acceleration data by the processor 110 each time the acoustic sensor 106 measures a bump. An example data showing peaks and measuring average space is shown in FIG. 7.

Alternatively, the analysis may be performed by measuring time intervals between peaks and troughs as follows:

For the 10000 kg trace, the spacing between troughs is 0.418 seconds
For the 20000 kg trace, the spacing between troughs is 0.502 seconds
For the 30000 kg trace, the spacing between troughs is 0.547 seconds For a 10000 kg mass, $T=2*pi*sqrt(m/k=10,000/1,800,000)=0.468$ seconds
For a 20000 kg mass, $T=2*pi*sqrt(m/k=20,000/2,500,000)=0.562$ seconds
For a 30000 kg mass, $T=2*pi*sqrt(m/k=30,000/3,000,000)=0.628$ seconds The value of 'k' is adjusted according to the mass. The trend shown in FIG. 7 is a result of the modification of the resonant frequency due to damping. In order to deal with modification in the trend, the damping has to be known or approximated. In the current example, the damping term is considered as 10,000 N/(m/s). It is to be understood that the damping coefficient needs to be known prior to calculating the frequency. Now, when the spring constant is measured, the damping constant is measured for measuring the mass of the shipping container.

For instance, consider that damping is known in the example presented above. Subsequently, Tdamp may be calculating as below.

$$Tdamp=2*pi*sqrt((2*pi/T0)^2+(damping/(2*mass))^2)$$

For a 10000 kg mass, Tdamp=0.439
For a 20000 kg mass, Tdamp=0.513
For a 30000 kg mass, Tdamp=0.562

When the values obtained are compared with the time intervals obtained without knowing the damping, the results in difference are presented as follows:
0.439/0.418=5% high
0.513/0.502=2% high
0.562/0.547=3% high By processing the acceleration data over a time interval after the acoustic signal being greater than the threshold, the mass of the shipping container is estimated.

The present disclosure is particularly useful in determine an object's weight in logistics applications. For example, the present disclosure may be used to determine whether the shipping container is empty, in order to know whether to route it to a shipping container depot or to assist with shipping container triangulation. In other example, the present disclosure may be used to change in a shipping container's weight if cargo had been taken in or out of the shipping container, thus detecting unauthorized stuffing or thefts.

Figure 8:
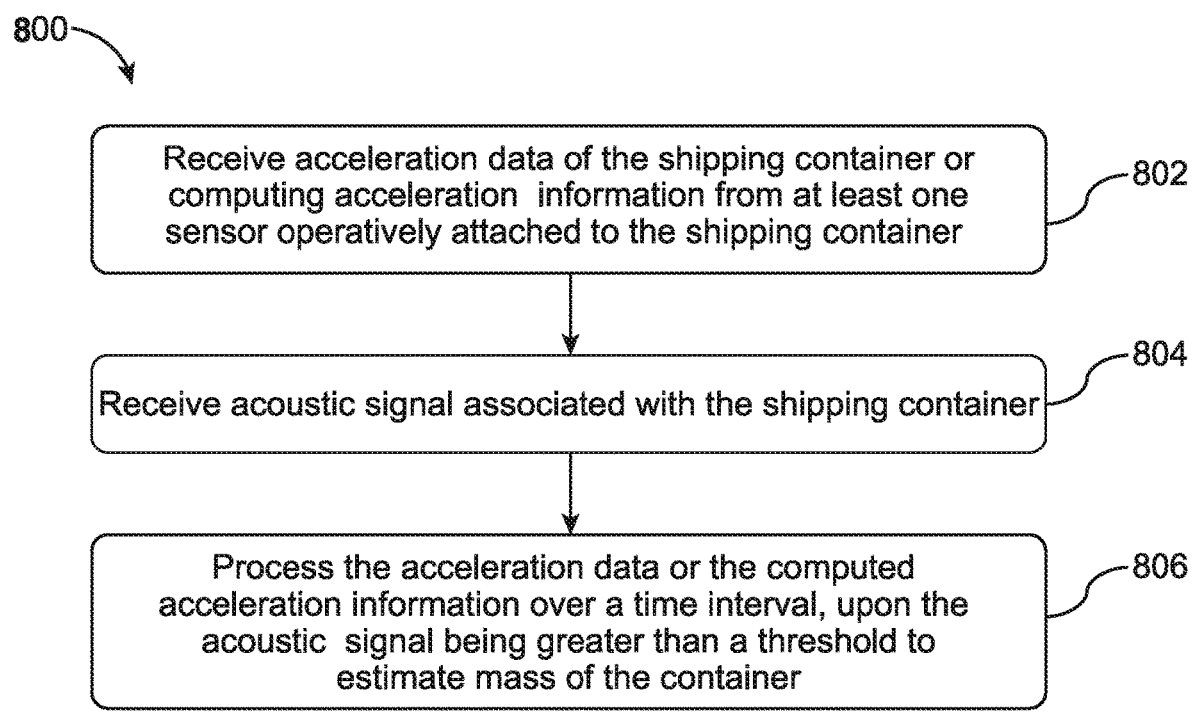
FIG. 8 shows a flowchart for method for estimating mass of a shipping container, in accordance with one embodiment of the present disclosure.

Referring now to FIG. 8, a method 800 for estimating mass of a shipping container while being transported on a platform is shown, in accordance with an embodiment of the present disclosure. The order in which the method 800 is described and is not intended to be construed as a limitation, and any number of the described method blocks can be combined in any order to implement the method 800 or alternate methods. Additionally, individual blocks may be deleted from the method 800 without departing from the spirit and scope of the disclosure described herein. However, for ease of explanation, in the embodiments described below, the method 800 may be implemented in the above-described apparatus 100.

At step 802, acceleration data of the shipping container or computing acceleration information is received from at least one sensor operatively attached to the shipping container.

At step 804, acoustic signal associated with the shipping container is received.

At step 806, the acceleration data or the computed acceleration information over a time interval, is processed upon the acoustic signal being greater than a threshold to estimate the mass of the shipping container from at least one of the acceleration data and the computed acceleration information.

Although embodiments of the apparatus and a method for estimating mass of a shipping container have been described in language specific to features and/or methods, it is to be understood that the description is not necessarily limited to the specific features or methods described. Rather, the specific features and methods are disclosed as examples of implementations of an apparatus and a method for estimating mass of a shipping container.

What is claimed is:
1. A method of estimating mass of a shipping container while being transported on a platform over a road, the method comprising:
receiving acceleration data of the shipping container or computing acceleration information from at least one sensor operatively attached to the shipping container;
receiving an acoustic signal responsive to the platform traveling over a non-uniformity in the road; and
upon the acoustic signal being greater than a threshold, processing the acceleration data or the computed acceleration information over a time interval thereby estimating the mass of the shipping container from at least one of the acceleration data and the computed acceleration information.

2. The method of claim 1 further comprising:
measuring distance between the shipping container and the ground as a function of time; and
computing the acceleration information by differentiating the measured distance over time.

3. The method of claim 1, wherein the platform is suspended on a suspension with a spring constant, the method further comprising:
measuring the spring constant and damping of the suspension of the platform.

4. The method of claim 1, further comprising:
performing Fourier transformation from time domain to frequency domain on the acceleration data or on the acceleration information.

5. The method of claim 1, further comprising:
upon the acoustic signal being greater than a threshold, measuring peaks in vibration resonant frequency of the shipping container.

6. An apparatus for estimating mass of a shipping container while being transported on a platform over a road, the apparatus comprising:
at least one sensor coupled to the shipping container to measure acceleration data of the shipping container or to compute acceleration information of the shipping container;
an acoustic sensor to measure acoustic signal responsive to the platform traveling over a non-uniformity in the road; and
a processor to process the acceleration data or the computed acceleration information over a time interval, and when the acoustic signal is greater than a threshold, the processor is configured to estimate the mass of the container from at least one of the acceleration data and the computed acceleration information.

7. The apparatus of claim 6, further comprising:
a proximity sensor to measure distance between the shipping container and the ground as a function of time.

8. The apparatus of claim 7, wherein the distance measured is used to compute the acceleration information by differentiating the measured distance over time.

9. The apparatus of claim 6, wherein the processor performs a Fourier transformation from time domain to frequency domain on the acceleration data or on the computed acceleration information.

10. The apparatus of claim 6, wherein the processor measures peaks in vibration resonant frequency of the shipping container from the acoustic signal.

11. A non-transitory computer readable storage medium comprising program instructions which, when executed, are configured to perform a method for estimating mass of a shipping container while being transported on a platform over a road, the method comprising:
receiving acceleration data of the shipping container or computing acceleration information from at least one sensor operatively attached to the shipping container;
receiving an acoustic signal responsive to the platform traveling over a non-uniformity in the road; and
upon the acoustic signal being greater than a threshold, processing the acceleration data or the computed acceleration information over a time interval thereby estimating the mass of the shipping container from at least one of the acceleration data and the computed acceleration information.

12. The apparatus of claim 6, wherein the processor estimates the mass by applying a windowing function to the acceleration data.

13. The apparatus of claim 6, wherein the platform is suspended on a suspension with a spring constant, the processor further configured to estimate mass of the shipping container relative to the spring constant.

* * * * *